(12) United States Patent
Werner

(10) Patent No.: US 11,590,702 B2
(45) Date of Patent: Feb. 28, 2023

(54) METHOD FOR ADDITIVELY MANUFACTURING AT LEAST ONE THREE-DIMENSIONAL OBJECT

(71) Applicant: CONCEPT LASER GMBH, Lichtenfels (DE)

(72) Inventor: Jürgen Werner, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 877 days.

(21) Appl. No.: 16/294,900

(22) Filed: Mar. 6, 2019

(65) Prior Publication Data

US 2020/0164580 A1    May 28, 2020

(30) Foreign Application Priority Data

Nov. 28, 2018    (EP) ..................................... 18208976

(51) Int. Cl.
*B29C 64/268* (2017.01)
*B33Y 10/00* (2015.01)
(Continued)

(52) U.S. Cl.
CPC ............ *B29C 64/268* (2017.08); *B22F 10/20* (2021.01); *B29C 64/153* (2017.08);
(Continued)

(58) Field of Classification Search
CPC ... B29C 64/268; B29C 64/153; B29C 64/277; B29C 64/393; B29C 64/371; B22F 10/20;
(Continued)

(56) References Cited

U.S. PATENT DOCUMENTS

| 10,603,748 B2 * | 3/2020 | Deiss ...................... B22F 12/00 |
| 2015/0165545 A1 * | 6/2015 | Goehler ............... B23K 26/342 |
| | | 219/121.15 |

(Continued)

FOREIGN PATENT DOCUMENTS

WO    WO2014/199134 A1    12/2014

OTHER PUBLICATIONS

European Search Report Corresponding to EP18208976 dated May 24, 2019.

*Primary Examiner* — Michael J Brown
(74) *Attorney, Agent, or Firm* — Dority & Manning, P.A.

(57) ABSTRACT

Method for additively manufacturing at least one three-dimensional object, comprising assigning a parameter indicative of the time required for irradiating a respective irradiation zone to a plurality of irradiation zones of a respective build material layer, assigning a first energy beam to the irradiation zone whose parameter indicates that the irradiation zone has the longest and second longest time required for irradiating and irradiating these irradiation zones with at least one respective first and second energy beams, wherein after irradiation and consolidating the irradiation zone whose parameter indicates that the irradiation zone has the second longest time required for irradiating and irradiating with the second energy beam is completed, assigning the at least one second energy beam to the irradiation zone whose parameter indicates that the irradiation zone has the third longest time required for irradiating and irradiating this irradiation zone with the at least one second energy beam.

12 Claims, 2 Drawing Sheets

Figure 1:
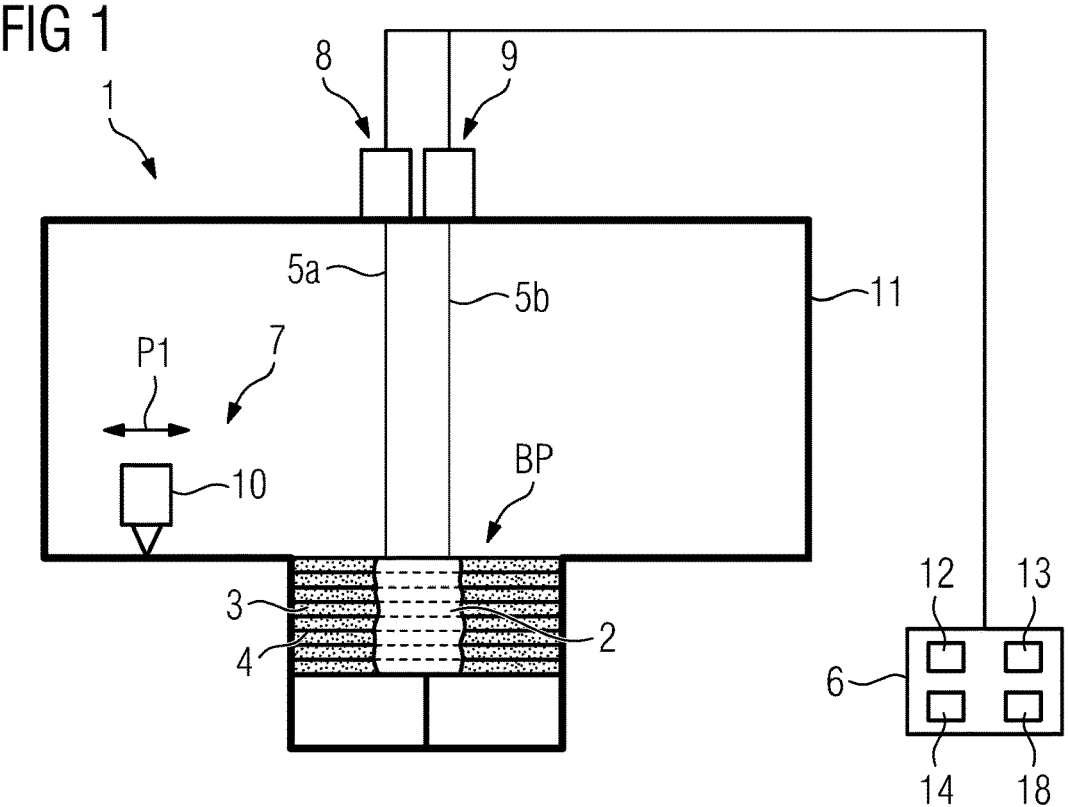

(51) Int. Cl.
*B29C 64/153* (2017.01)
*B29C 64/393* (2017.01)
*B29C 64/277* (2017.01)
*B22F 10/20* (2021.01)
*C04B 35/653* (2006.01)
*B33Y 30/00* (2015.01)
*B33Y 50/02* (2015.01)
*B29C 64/371* (2017.01)
*B22F 10/30* (2021.01)

(52) U.S. Cl.
CPC .......... *B29C 64/277* (2017.08); *B29C 64/393* (2017.08); *B22F 10/30* (2021.01); *B22F 2201/11* (2013.01); *B29C 64/371* (2017.08); *B33Y 10/00* (2014.12); *B33Y 30/00* (2014.12); *B33Y 50/02* (2014.12)

(58) Field of Classification Search
CPC ...... B22F 10/30; B22F 2201/11; B33Y 10/00; B33Y 30/00; B33Y 50/02; C04B 2235/665; C04B 35/653; C04B 2235/6026; Y02P 10/25
USPC ......................................................... 700/117
See application file for complete search history.

(56) References Cited

U.S. PATENT DOCUMENTS

2016/0114432 A1 4/2016 Ferrar et al.
2017/0021572 A1* 1/2017 Wiesner .................. B22F 10/00
2017/0320264 A1 11/2017 Herzog et al.

\* cited by examiner

METHOD FOR ADDITIVELY MANUFACTURING AT LEAST ONE THREE-DIMENSIONAL OBJECT

CROSS-REFERENCE TO RELATED APPLICATIONS

This application claims priority to European Patent Application Ser. No. 18 208 976.3 filed Nov. 28, 2018, the contents of which is incorporated herein by reference in its entirety as if set forth verbatim.

The invention relates to a method for additively manufacturing at least one three-dimensional object by means of successive layerwise selective irradiation and consolidation of build material layers, whereby at least one build material layer which is to be selectively irradiated and consolidated comprises a plurality of irradiation zones being separately irradiatable and consolidatable with at least one energy beam.

Respective methods for additively manufacturing at least one three-dimensional object, which may be implemented as selective electron beam melting processes or selective laser melting processes, for instance, are known from the technical field of additive manufacturing.

An important aspect of additive manufacturing is the control of the selective irradiation and consolidation of respective build material layers which are to be selectively irradiated and consolidated in the course of additively building-up a three-dimensional object. A respective control shall particularly allow for a best possible reduction of build times without compromising the structural properties of the three-dimensional object which is to be additively manufactured.

In order to reduce build times, additive manufacturing with multiple energy beams and/or with multiple irradiation units has been proposed. In this context, a specific important aspect of additive manufacturing is the control of the multiple energy beams and respective irradiation units used for selectively irradiating and consolidating of respective build material layers, respectively. A respective control shall allow for a best possible uniform operation of the multiple energy beams and respective irradiation units, respectively.

With regard to the above aspects, diverse irradiation approaches or irradiation strategies have been proposed. Yet, there still exists a need for further developing of methods for additively manufacturing three-dimensional objects with respect to a (further) reduction of build times and/or a best possible uniform operation of multiple energy beams and respective irradiation units, respectively.

In view of the above, it is the object of the invention to provide an improved method for additively manufacturing at least one three-dimensional object, particularly allowing for reduced build times and/or a best possible uniform operation of multiple energy beams and respective irradiation units, respectively.

This object is achieved by the subject-matter of the independent Claims. The Claims depending on the independent Claims relate to possible embodiments of the subject-matters of the independent Claims.

An aspect of the present invention refers to a method for additively manufacturing at least one three-dimensional object ("object") by means of successive layerwise selective irradiation and consolidation of build material layers, i.e. layers of a build material, which can be consolidated by means of being irradiated with at least one energy beam. The build material may be provided as a powder, for instance. The build material may be or comprise a ceramic, a polymer, or a metal, for instance. The energy beam may be an electron beam or a laser beam, for instance. The build material layers which are to be selectively irradiated and consolidated may be successively applied in a build plane of an apparatus for additively manufacturing at least one object which is used for performing the method. The method may be implemented as a selective laser sintering method, a selective laser melting method, or a selective electron beam melting method, for instance. Yet, it is also conceivable that the method is a binder jetting method, particularly a metal binder jetting method, for instance.

The method is performable or performed by an apparatus for additively manufacturing at least one object ("additive manufacturing apparatus"). The additive manufacturing apparatus for performing the method may be embodied as a selective laser sintering apparatus, a selective laser melting apparatus, or a selective electron beam melting apparatus, for instance. Yet, it is also conceivable that the additive manufacturing apparatus for performing the method is embodied as a binder jetting apparatus, particularly a metal binder jetting apparatus, for instance.

Each build material layer which is to be selectively irradiated and consolidated comprises at least one irradiation zone which is to be irradiated and consolidated by means of at least one energy beam. Hence, a respective irradiation zone may define a specific sub-zone of a respective build material layer. A respective irradiation zone typically, corresponds to the or a cross-section of a respective object, which is to be additively manufactured, in the respective build material layer.

A respective irradiation zone is typically irradiated on basis of an irradiation pattern comprising a number of irradiation vectors, e.g. scan vectors, in a specific arrangement relative to each other. The irradiation vectors typically define the path of the at least one energy beam across the respective irradiation zone. A respective irradiation pattern may be a stripe-pattern, a chessboard-or checkerboard-pattern, or an island pattern, for instance. Yet, other irradiation patterns are conceivable as well.

A respective irradiation pattern may comprise a plurality of irradiation pattern elements separately irradiatable or irradiated with the at least one energy beam. Each irradiation pattern element may define a specific sub-zone of a respective irradiation zone. Each irradiation pattern element comprises a number of irradiation vectors in in a specific arrangement relative to each other. Respective irradiation pattern elements are typically distributed across a respective irradiation zone in a specific arrangement relative to each other. Respective irradiation pattern elements may be arranged in a regular arrangement or in an irregular arrangement. Each irradiation pattern element may have a specific shape, specific dimensions and a specific orientation. Merely as an example, a respective irradiation pattern element may have the shape of a rectangle, particularly the shape of a square. Typically, all irradiation pattern elements of a respective irradiation zone have the same basic shape, the same dimensions, and the same orientation. Yet, irradiation pattern elements of a specific irradiation zone having different basic shapes and/or dimensions and/or orientations are conceivable as well.

During additively manufacturing of an object, it is oftentimes the case that at least one build material layer which is to be selectively irradiated and consolidated comprises a plurality of, particularly separate, irradiation zones. Respective irradiation zones may be separately irradiatable and consolidatable with at least one energy beam. This typically requires multiple energy beams and/or multiple irradiation units. As such, an additive manufacturing apparatus having a multiple energy beam configuration, e.g. an additive manufacturing apparatus comprising multiple irradiation units for selectively irradiating and consolidating a respective build material layer with multiple energy beams, is typically used for performing the method.

According to the method, for at least one build material layer which is to be selectively irradiated and consolidated and which comprises a plurality of irradiation zones being separately irradiatable and consolidatable with at least one energy beam, a special controlling and processing of the energy beams which results in a reduction of build time and/or a uniform operation of the energy beams and irradiation units, respectively is feasible. As will be apparent from below, the special controlling and processing of the energy beams results in a special order of irradiating respective irradiation zones of a respective build material layer.

According to a first step of the method, a parameter directly or indirectly indicative of the time required for irradiating respective irradiation zones of a respective build material layer comprising a plurality of irradiation zone is assigned to a plurality of irradiation zones in the build material layer, particularly for each of the plurality of irradiation zones of the build material layer. A respective parameter may be the actual area (size) of a respective irradiation zone and/or the actual time (duration) required for irradiating a respective irradiation zone at given irradiation parameters, for instance. The parameter may be generated on basis of a determination of diverse irradiation zone parameters of the respective irradiation zones within the respective build material layer, for instance. Each respective irradiation zone parameter contains information allowing for a deduction of the parameter directly or indirectly indicative of the time required for irradiating the respective irradiation zone the respective irradiation zone parameter refers to. A respective irradiation zone parameter may directly or indirectly describe the area (size) and/or shape and/or position and/or orientation, etc. of the irradiation zone the respective irradiation zone parameter refers to, for instance. At least one hardware- and/or software implemented data processing unit configured to process data, e.g. respective irradiation zone parameters, so as to obtain a respective parameter indicative of the time required for irradiating respective irradiation zones of a respective build material layer comprising a plurality of irradiation zone may be used for generating respective parameters. The data processing unit may be implemented in a control unit of an additive manufacturing apparatus used for performing the method.

The assignment of respective parameters to respective irradiation zones may be performed in random or non-random order. In non-random order, a specific direction of a respective build material layer may be chosen in which irradiation zones are identified and assigned with a respective parameter. In other words, the build material layer may be searched for irradiation zones and found irradiation zones may be assigned with a respective parameter.

According to a second step of the method, at least one first energy beam, i.e. one or more first energy beams, and/or at least one first irradiation unit, i.e. one or more first irradiation units, is/are assigned to the irradiation zone whose parameter indicates that this irradiation zone has or requires the longest time for (complete) irradiating or the longest time for being (completely) irradiated. Hence, at least one first energy beam of a plurality of energy beams and/or at least one first irradiation unit of a plurality of irradiation units is selected for irradiating the irradiation zone whose parameter indicates that this irradiation zone has or requires the longest time for (complete) irradiating or the longest time for being (completely) irradiated, respectively. At least one hardware- and/or software implemented assigning and/or selecting unit configured to assign and select the at least one first energy beam and/or the at least one first irradiation unit for irradiating the irradiation zone whose parameter indicates that this irradiation zone has or requires the longest time for (complete) irradiating or the longest time for being (completely) irradiated, respectively may be used for assigning and selecting the at least one first energy beam and/or the at least one first irradiation unit for irradiating the irradiation zone whose parameter indicates that this irradiation zone has or requires the longest time for (complete) irradiating or the longest time for being (completely) irradiated, respectively. The assigning and/or selecting unit may be implemented in a control unit of an additive manufacturing apparatus used for performing the method.

According to a third step of the method, at least one second energy beam, i.e. one or more second energy beams, and/or at least one least one second irradiation unit, i.e. one or more second irradiation units, is/are assigned to the irradiation zone whose parameter indicates that this irradiation zone has or requires the second longest time for (complete) irradiating or the second longest time for being (completely) irradiated, respectively. Hence, at least one second energy beam of a plurality of energy beams and/or at least one second irradiation unit of a plurality of irradiation units is selected for irradiating the irradiation zone whose parameter indicates that this irradiation zone has or requires the second longest time for (complete) irradiating or the second longest time for being (completely) irradiated, respectively. The or at least one hardware- and/or software implemented assigning and/or selecting unit configured to assign and select the at least one second energy beam and/or the at least one second irradiation unit for irradiating the irradiation zone whose parameter indicates that this irradiation zone has or requires the second longest time for (complete) irradiating or the second longest time for being (completely) irradiated, respectively may be used for assigning and selecting the at least one second energy beam and/or the at least one second irradiation unit for irradiating the irradiation zone whose parameter indicates that this irradiation zone has or requires the second longest time for (complete) irradiating or the second longest time for being (completely) irradiated, respectively. The assigning and/or selecting unit may be implemented in a control unit of an additive manufacturing apparatus used for performing the method.

After irradiation and consolidating of the irradiation zone whose parameter indicates or indicated that the irradiation zone has or requires the second longest time for (complete) irradiating or the second longest time for being (completely) irradiated, respectively by the at least one second energy beam and/or the at least one second irradiation unit is completed, the at least one second energy beam and/or the at least one second irradiation unit is assigned to the irradiation zone whose parameter indicates or indicated that the irradiation zone has or requires the third longest time for (complete) irradiating or the third longest time for being (completely) irradiated and the irradiation zone whose parameter indicates or indicated that the irradiation zone has or requires the third longest time for (complete) irradiating or the third longest time for being (completely) irradiated is irradiated with the at least one second energy beam and/or the at least one second irradiation unit. Hence, a fourth step of the method comprises assigning the at least one second energy beam and/or the at least one second irradiation unit to the irradiation zone whose parameter indicates that the irradiation zone has the third longest time required for irradiating or the third longest time for being (completely) irradiated, respectively and irradiating this irradiation zone with the at least one second energy beam and/or the at least one second irradiation unit.

The method may be continued in analogous manner. Hence, after irradiation and consolidating of the irradiation zone whose parameter indicates or indicated that the irradiation zone has or requires the longest time for (complete) irradiating or the longest time for being (completely) irradiated by the at least one first energy beam and/or the at least one first irradiation unit is completed, the at least one first energy beam and/or the at least one first irradiation unit is assigned to the irradiation zone whose parameter indicates or indicated that the irradiation zone has or requires the fourth longest time for (complete) irradiating or the fourth longest time for being (completely) irradiated, respectively and the irradiation zone whose parameter indicates or indicated that the irradiation zone has or requires the fourth longest time for (complete) irradiating or the fourth longest time for being (completely) irradiated, respectively is irradiated with the at least one first energy beam and/or the at least one first irradiation unit. Hence, the method may further comprise after irradiation and consolidating the irradiation zone whose parameter indicates that the irradiation zone has the longest time required for irradiating and irradiating with the at least one first energy beam and/or the at least one first irradiation unit is completed, assigning the at least one first energy beam and/or the at least one first irradiation unit to the irradiation zone whose parameter indicates that the irradiation zone has the fourth longest time required for irradiating and irradiating this irradiation zone with the at least one first energy beam and/or the at least one first irradiation unit.

Hence, the method comprises the implementation of a specific order of irradiating respective irradiation zones of a respective build material layer which results in a reduction of build time and/or a uniform operation of the energy beams and irradiation units, respectively.

As is apparent from above, the method is particularly applicable to build material layers having a plurality of different irradiation zones, whereby the differences, which may be differences in area (size) and/or shape and/or position and/or orientation, for instance, of the irradiation zones result in different times for (completely) irradiating the respective irradiation zones.

In the possible case that the parameters of two or more irradiation zones of a specific build material layer indicate that these two or more irradiation zones each (absolutely or relatively) have the longest time for (complete) irradiating or the longest time for being (completely) irradiated, respectively, a decision is made to which of these irradiation zones the at least one first energy beam and/or the at least one first irradiation unit is assigned and to which of these irradiation zones the at least one second energy beam and/or the at least one second irradiation unit is assigned. In other words, if two or more irradiation zones of a specific build material layer require the same time for (complete) irradiating or the same time for being (completely) irradiated, respectively and this time exceeds the time for (complete) irradiating or the time for being (completely) irradiated, respectively of other irradiation zones in the respective build material layer, then a decision is made to which of these irradiation zones the at least one first energy beam and/or at least one first irradiation unit is assigned and to which of these irradiation zones the at least one second energy beam and/or the at least one second irradiation unit is assigned. The decision can be a random or a non-random decision.

The decision can be made by at least one hardware- and/or software implemented decision unit. The decision unit may be implemented in a control unit of an additive manufacturing apparatus used for performing the method.

As indicated above, the parameter indicative of the time required for irradiating a respective irradiation zone may be generated on basis of a determination of diverse irradiation zone parameters of the respective irradiation zones within the respective build material layer, for instance.

Generally, the parameter indicative of the time required for irradiating a respective irradiation zone may be additionally or alternatively determined on basis of data used for irradiating the respective irradiation zone in the current build material layer and/or on basis of data used for irradiating at least one irradiation zone of a previous build material layer and/or on basis of data used for irradiating at least one irradiation zone of at least one build material layer of at least one previous build job, for instance. In other words, additionally or alternatively to determining, e.g. computing, the parameter indicative of the time required for irradiating a respective irradiation zone from data used for irradiating the respective irradiation zone, "historic data" of previously irradiated build material layers in the same build job and/or of previous build jobs, i.e. previously built objects, can be used or considered for determining the parameter indicative of the time required for irradiating a respective irradiation zone.

The data used for irradiating the respective irradiation zone and/or the data used for irradiating at least one irradiation zone of a previous build material layer in the same build job and/or the data used for irradiating at least one irradiation zone of at least one build material layer of at least one previous build job may be or may comprise information on the area (size) of a respective irradiation zone and/or information on the shape of a respective irradiation zone and/or information on the time (duration) required for irradiating a respective irradiation zone at given irradiation parameters, particularly at irradiation parameters being correlated with the speed the energy beam is moved across the respective build material layer, such as the actual scan speed of the energy beam, for instance.

Hence, the method may further comprise determining the area (size) of a respective irradiation zone for each of the plurality of irradiation zones and/or the shape of a respective irradiation zone for each of the plurality of irradiation zones and/or the time required for irradiating a respective irradiation zone for each of the plurality of irradiation zones. The area (size) of a respective irradiation zone may be determined on basis of irradiating data used for irradiating the respective irradiation zone and/or on basis of build data used for building the object, for instance. The shape of a respective irradiation zone may be determined on basis of irradiating data used for irradiating the respective irradiation zone and/or on basis of build data used for building the object, for instance. The time (duration) required for irradiating a respective irradiation zone may be determined on basis of irradiating data used for irradiating the respective irradiation zone and/or on basis of build data used for building the object, for instance. In either case, a determination unit configured to determine the area (size) of a respective irradiation zone for each of the plurality of irradiation zones and/or the shape of a respective irradiation zone for each of the plurality of irradiation zones and/or the time required for irradiating a respective irradiation zone for each of the plurality of irradiation zones may be used for determining the area (size) of a respective irradiation zone for each of the plurality of irradiation zones and/or the shape of a respective irradiation zone for each of the plurality of irradiation zones and/or the time required for irradiating a respective irradiation zone for each of the plurality of irradiation zones. The determination unit may be implemented in a control unit of an additive manufacturing apparatus used for performing the method.

The parameter indicative of the time required for irradiating a respective irradiation zone may be determined before selective irradiation of the respective build material layer is started. Hence, the order of irradiating respective irradiation zones of a respective build material layer may be determined before selective irradiation of the respective build material layer is started which results in that no further (computing) resources for determining the order of irradiating respective irradiation zones of a respective build material layer are required during the actual selective irradiation of the respective build material layer.

The method may further comprise considering at least one boundary condition for assigning the at least one first energy beam and/or the at least one irradiation unit to the irradiation zone whose parameter indicates that the irradiation zone has the longest time required for irradiating and/or considering at least one boundary condition for assigning the at least one second energy beam and/or the at least one second irradiation unit to the irradiation zone whose parameter indicates that the irradiation zone has the second longest time required for irradiating. This applies to all other irradiation order steps in analogous manner. As such, the order of irradiation may be individually adapted if required, i.e. in cases in which at least one respective boundary condition is met or not met, respectively.

As an example, the area (size) and/or shape and/or orientation and/or position of a first irradiation zone which is irradiatable by a first irradiation unit and/or the area (size) and/or shape and/or orientation and/or position of a second irradiation zone which is irradiatable by a second irradiation unit may be considered as a boundary condition. As such, the position and/or orientation of irradiation zones within sub-zones of the build plane which sub-zones of the build plane are assigned to at least one specific irradiation unit may be considered as a boundary condition. Thus, situations in which an irradiation zone is to be irradiated with an energy beam and/or an irradiation unit which cannot (completely) cover or reach the respective irradiation zone can be avoided. In such a manner, a high process- and object quality can be assured.

As a further example, the orientation and/or position of a respective irradiation zone relative to a gas stream, e.g. an inert gas stream, capable of being charged with non-consolidated particulate impurities and/or residues generated during selective irradiation of a build material layer may be considered as a boundary condition. As such, the position and/or orientation of irradiation zones relative to the streaming direction of a respective gas stream may be considered as a boundary condition. Thus, situations in which irradiating an irradiation zone could or would result in negative interaction of the energy beam which was initially supposed to be used for irradiating the respective irradiation zone with the gas stream can be avoided. In such a manner, a high process- and object quality can be assured.

Irradiating the irradiation zone whose assigned parameter indicates that the irradiation zone has the longest time required for irradiating and the irradiation zone whose assigned parameter indicates that the irradiation zone has the second longest time required for irradiating may be started at the same time. This allows for a best possible reduction of the build time. Generally, different irradiation zones can be irradiated with different energy beams and/or irradiation units at the same time.

Irradiating the irradiation zone whose assigned parameter indicates that the irradiation zone has the longest time required for irradiating and the irradiation zone whose assigned parameter indicates that the irradiation zone has the second longest time required for irradiating are irradiated with the same irradiation parameters, such as intensity, power, speed, etc. of a respective energy beam. This allows for uniform structural properties of the object which is/was additively manufactured with the method in all cross-sectional areas.

Generally, all irradiation zones can be irradiated with the same irradiation parameters. Yet, it is also conceivable that the irradiation zone whose assigned parameter indicates that the irradiation zone has the longest time required for irradiating and the irradiation zone whose assigned parameter indicates that the irradiation zone has the second longest time required for irradiating are irradiated with different irradiation parameters. This allows for providing different cross-sectional areas of the object which is/was additively manufactured with the method with different structural properties which can be useful e.g. for realizing objects having customized structural properties.

Another aspect of the invention refers to a hardware- and/or software-embodied control unit for an apparatus for additively manufacturing at least one three-dimensional object by means of successive layerwise selective irradiation and consolidation of build material layers, whereby at least one build material layer which is to be selectively irradiated and consolidated comprises a plurality of irradiation zones being separately irradiatable and consolidatable with at least one energy beam. The control unit is configured to control the successive layerwise selective irradiation and consolidation of respective irradiation zones in accordance with the method described herein. As such, the control unit is particularly configured to assign a parameter indicative of the time required for irradiating a respective irradiation zone to each of the plurality of irradiation zones; assign at least one first energy beam and/or at least one first irradiation unit to the irradiation zone whose parameter indicates that the irradiation zone has the longest time required for irradiating and irradiating this irradiation zone with the at least one first energy beam; assign at least one second energy beam and/or the at least one second irradiation unit to the irradiation zone whose parameter indicates that the irradiation zone has the second longest time required for irradiating and irradiating this irradiation zone with the at least one second energy beam; and after irradiation and consolidating the irradiation zone whose parameter indicates that the irradiation zone has the second longest time required for irradiating and irradiating with the at least one second energy beam and/or the at least one second irradiation unit is completed, assign the at least one second energy beam and/or the at least one second irradiation unit to the irradiation zone whose parameter indicates that the irradiation zone has the third longest time required for irradiating and irradiating this irradiation zone with the at least one second energy beam and/or the at least one second irradiation unit.

Another aspect of the invention refers to an apparatus for additively manufacturing at least one three-dimensional object by means of successive layerwise selective irradiation and consolidation of build material layers. The apparatus comprises or is connected with a control unit as described herein.

The apparatus can be embodied as a selective laser sintering apparatus, a selective laser melting apparatus, or a selective electron beam melting apparatus, for instance. Yet, it is also conceivable that the apparatus is embodied as a binder jetting apparatus, particularly a metal binder jetting apparatus, for instance.

The additive manufacturing apparatus comprises a number of functional and/or structural units which are operable or operated during its operation. Each functional and/or structural unit may comprise a number of functional and/or structural sub-units. Exemplary functional and/or structural units are a build material application unit which is configured to apply an amount of build material which is to be selectively irradiated and consolidated in a build plane of the apparatus so as to form a build material layer which is to be selectively irradiated and consolidated in the build plane of the additive manufacturing apparatus, a plurality of irradiation units which are configured to selectively irradiate and thereby, consolidate build material layers, particularly respective irradiation zones, with at least one energy beam, and a respective control unit.

Each irradiation unit of the additive manufacturing apparatus may comprise an energy beam source, e.g. an electron or laser beam source. Yet, a plurality of irradiation units may be assigned to a single energy beam source, whereby an energy beam generated by the single energy beam source may be processed, e.g. deflected and/or split, so as to guide the energy beam provided by the energy beam source to the assigned irradiation units by suitable optical elements such as beam splitters, mirrors, etc. Further, each irradiation unit may be built as or comprise at least one beam deflecting unit for deflecting an energy beam to diverse positions in a build plane. A respective beam deflecting unit may comprise one or more optical elements such as object lenses, in particular an f-theta lenses, diffractive optical elements, deflection mirrors, etc.

All annotations regarding the method also apply to the control unit and/or to the apparatus.

Figure 2:
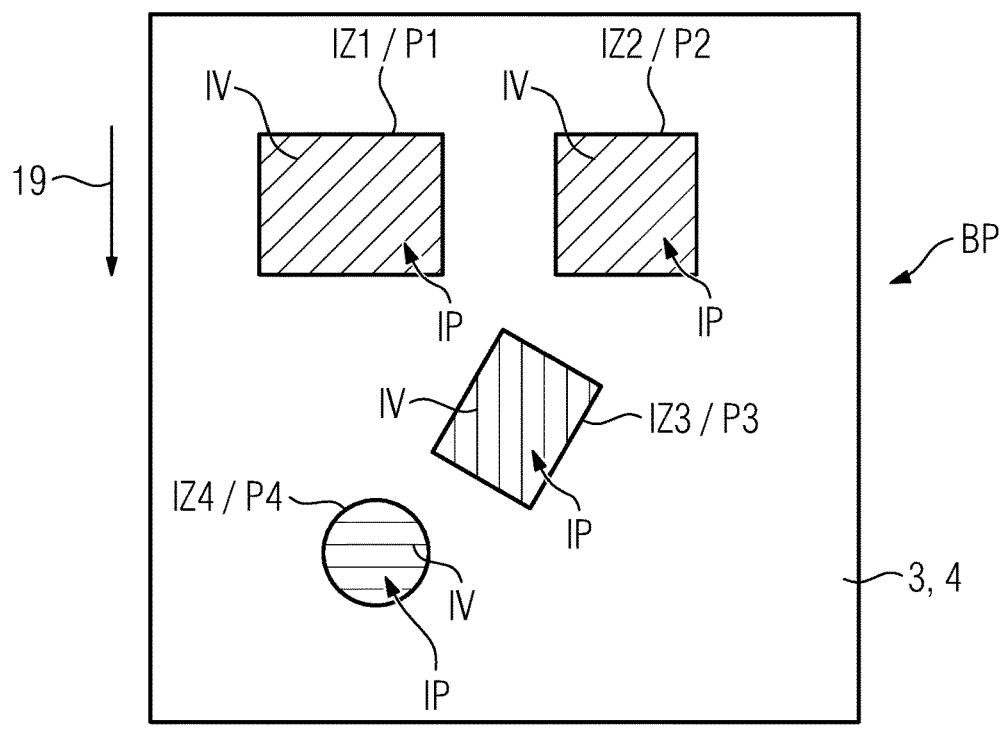
Figure 4:
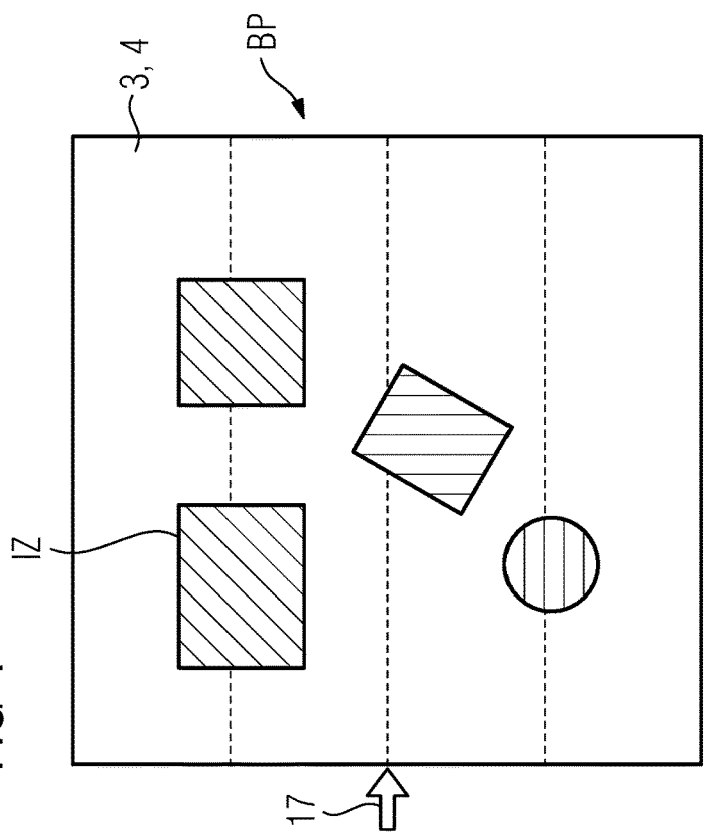
Figure 3:
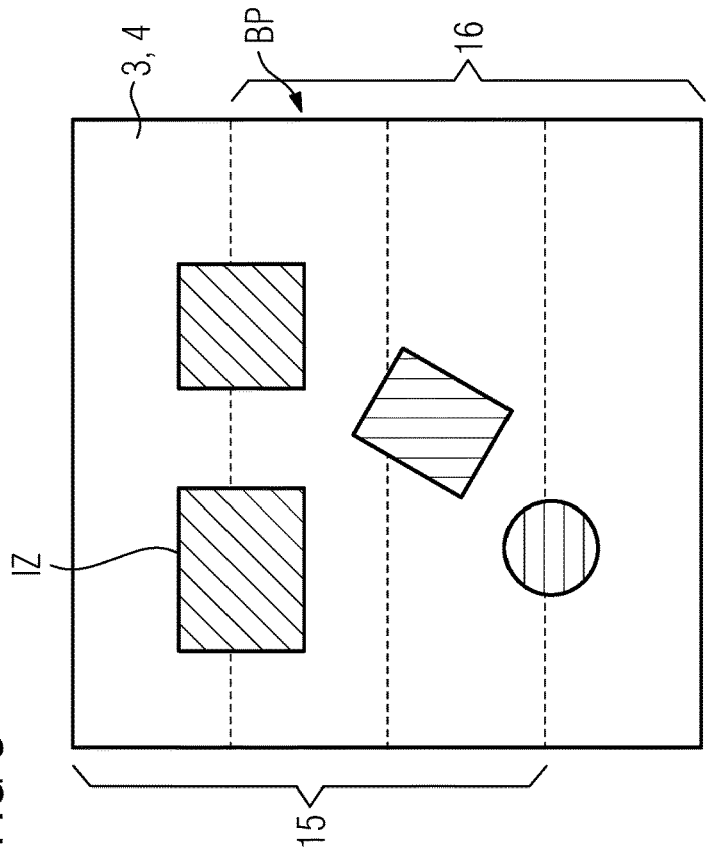

Exemplary embodiments of the invention are described with reference to the Fig., whereby:

FIG. 1 shows a principle drawing of an apparatus for additively manufacturing of three-dimensional objects according to an exemplary embodiment; and FIG. 2-4 each show a principle drawing of a build material layer which is to be selectively irradiated and consolidated in accordance with a method according to an exemplary embodiment in a top-view.

FIG. 1 shows a principle drawing of an exemplary embodiment of an apparatus 1 for additively manufacturing three-dimensional objects 2, e.g. technical components, by means of successive layerwise selective irradiation and accompanying consolidation of build material layers 3 of a powdered build material 4, e.g. a metal powder, which can be consolidated by means of at least one energy beam 5a, 5b according to an exemplary embodiment. A respective energy beam 5a, 5b may be an electron beam or a laser beam, for instance. The apparatus 1 may be embodied as selective electron beam melting apparatus or as a selective laser melting apparatus, for instance.

The apparatus 1 comprises a number of functional and/or structural units which are operable and operated during its operation. Each functional and/or structural unit may comprise a number of functional and/or structural sub-units. Operation of the functional and/or structural units and the apparatus 1, respectively is controlled by a hard- and/or software embodied (central) control unit 6.

Exemplary functional and/or structural units of the apparatus 1 are a build material application unit 7, a first irradiation unit 8, a second irradiation unit 9, and the control unit 6. Further functional and/or structural units of the apparatus 1 may be provided even though not depicted in the Fig.

The build material application unit 7 is configured to apply an amount of build material 4 in the build plane BP of the apparatus 1 so as to successively generate respective build material layers 3 which are to be selectively irradiated and consolidated during additively manufacturing an object 2. The build material application unit 7 may comprise a build material application element 9 which may be embodied as a blade-like re-coating element, for instance. The build material application element 10 may be moveably supported within a process chamber 11 of the apparatus 1; the build material application element 10 may particularly be moved across the build plane BP so as to apply an amount of build material 4 in the build plane BP so as to generate a respective build material layer 3 which is to be selectively irradiated and consolidated during additively manufacturing an object 2. An exemplary motion of the build material application element 10 across the build plane BP is indicated by double-arrow P1. A drive unit (not shown) may be assigned to the build material application unit 7 so as to generate a drive force for moving the build material application element 10 across the build plane BP.

The irradiation units 8, 9 are each configured to selectively irradiate and thereby, consolidate respective build material layers 3 which have been applied in the build plane BP of the apparatus 1 by means of the build material application unit 7 with at least one energy beam 5a, 5b. The first irradiation unit 8 is configured to emit a first energy beam 5a towards the build plane BP so as to selectively irradiate a respective build material layer 3 with the first energy beam 5a, the second irradiation unit 9 is configured to emit a second energy beam 5b towards the build plane BP so as to selectively irradiate a respective build material layer 3 with the second energy beam 5b. Each irradiation unit 8, 9 may comprise a beam generating unit (not shown) configured to generate the respective energy beam 5a, 5b. Yet, the irradiation units 8, 9 may also be coupled with a single beam generating unit (not shown) and a single energy beam source, respectively. The irradiation unit 8 may further comprise a beam deflecting unit (not shown), e.g. a scanning unit, configured to deflect the at least one energy beam 5 to diverse positions within the build plane BP.

The control unit 6 is configured to implement a method for additively manufacturing an object 2 according to exemplary embodiments which will be explained in more detail in context with FIG. 2-4.

FIG. 2 shows an exemplarily build material layer 3 which is to be selectively irradiated and consolidated by the irradiation units 8, 9 in a top-view. The build material layer 3 comprises a plurality of irradiation zones IZ1-IZ4 which are to be irradiated and consolidated by means of the energy beams 5a, 5b-FIG. 2 shows four different irradiation zones IZ1-IZ4 merely as an example, i.e. the or a respective build material layer 3 could comprise more or less than four irradiation zones IZ1-IZ4.

Each respective irradiation zone IZ1-IZ4 is irradiated on basis of an irradiation pattern IP comprising or number of irradiation pattern elements defined by irradiation vectors IV, e.g. scan vectors, in a specific arrangement relative to each other. The irradiation vectors IV define the path of the respective energy beam 5a, 5b across a respective irradiation zone IZ1-IZ4.

FIG. 2 shows an exemplary embodiment in which a respective irradiation pattern IP may comprise a plurality of stripe-like shaped irradiation pattern elements arranged in a specific parallel arrangement relative to each other. Other irradiation patterns IP, i.e. other shapes, orientations, or positions of irradiation pattern elements, are conceivable.

According to an exemplarily embodiment of the method, a special controlling and processing of the energy beams 5a, 5b and irradiation units 8, 9, respectively which results in a reduction of build time and/or a uniform operation of the energy beams 5a, 5b and irradiation units 8, 9, respectively is feasible. As will be apparent from below, the special controlling and processing of the energy beams 5a, 5b and irradiation units 8, 9 results in a special order of irradiating respective irradiation zones IZ1-IZ4 of the build material layer 3.

According to a first step of the method, a parameter P1-P4 directly or indirectly indicative of the time required for irradiating respective irradiation zones IZ1-IZ4 of the build material layer 3 is assigned to each of the plurality of irradiation zones IZ1-IZ4 of the build material layer 3. A respective parameter P1-P4 may be the actual area (size) of a respective irradiation zone IZ1-IZ4 and/or the actual time (duration) required for irradiating a respective irradiation zone IZ1-IZ4 at given irradiation parameters, for instance. A respective parameter IZ1-IZ4 may be generated on basis of a determination of diverse irradiation zone parameters of the respective irradiation zones IZ1-IZ4 within the build material layer 3, for instance. Each respective irradiation zone parameter contains information allowing for a deduction of the parameter P1-P4 directly or indirectly indicative of the time required for irradiating the respective irradiation zone IZ1-IZ4 the respective irradiation zone parameter refers to. A respective irradiation zone parameter may directly or indirectly describe the area (size) and/or shape and/or position and/or orientation, etc. of the irradiation zone IZ1-IZ4 the respective irradiation zone parameter refers to, for instance. A hardware- and/or software implemented data processing unit 12 configured to process data, e.g. respective irradiation zone parameters, so as to obtain a respective parameter P1-P4 indicative of the time required for irradiating respective irradiation zones IZ1-IZ4 of the build material layer 3 may be used for generating respective parameters P1-P4. The data processing unit 12 may be implemented in the control unit 6 of the apparatus 1.

The assignment of respective parameters P1-P4 to respective irradiation zones IZ1-IZ4 may be performed in random or non-random order. In non-random order, a specific direction (exemplarily indicated by arrow 19) of the build material layer 3 may be chosen in which irradiation zones IZ1-IZ4 are identified and assigned with a respective parameter P1-P4. In other words, the build material layer 3 may be searched for irradiation zones IZ1-IZ4 and found irradiation zones IZ1-IZ4 may be assigned with a respective parameter P1-P4.

In the exemplary embodiment of the Fig., irradiation zone IZ1 has a parameter P1 indicating the longest time required for irradiating, irradiation zone IZ2 has a parameter P2 indicating the second longest time required for irradiating, irradiation zone IZ3 has a parameter P3 indicating the third longest time required for irradiating, and irradiation zone IZ4 has a parameter P4 indicating the fourth longest time required for irradiating.

According to a second step of the method, a first energy beam 5a and a first irradiation unit 8, are assigned to the irradiation zone IZ1 whose parameter P1 indicates that this irradiation zone IZ1 has or requires the longest time for (complete) irradiating or the longest time for being (completely) irradiated. Hence, the first energy beam 5a and the first irradiation unit 8 is selected for irradiating the irradiation zone IZ1 whose parameter P1 indicates that this irradiation zone IZ1 has or requires the longest time for (complete) irradiating or the longest time for being (completely) irradiated, respectively. A hardware- and/or software implemented assigning and/or selecting unit 13 configured to assign and select the first energy beam 5a and the first irradiation unit 8 for irradiating the irradiation zone IZ1 whose parameter P1 indicates that this irradiation zone IZ1 has or requires the longest time for (complete) irradiating or the longest time for being (completely) irradiated, respectively may be used for assigning and selecting the first energy beam 5a and the first irradiation unit 8 for irradiating this irradiation zone IZ1. The assigning and/or selecting unit 13 may be implemented in the control unit 6 of the apparatus 1.

According to a third step of the method, a second energy beam 5b and a second irradiation unit 9 are assigned to the irradiation zone IZ2 whose parameter P2 indicates that this irradiation zone IZ2 has or requires the second longest time for (complete) irradiating or the second longest time for being (completely) irradiated, respectively. Hence, the second energy beam 5b and the second irradiation unit 9 is selected for irradiating the irradiation zone IZ2 whose parameter P2 indicates that this irradiation zone IZ2 has or requires the second longest time for (complete) irradiating or the second longest time for being (completely) irradiated, respectively. The assigning and/or selecting unit 13 may be used for assigning and selecting the second energy 5b and the second irradiation unit 9 for irradiating this irradiation zone IZ2.

After irradiation and consolidating of the irradiation zone IZ2 whose parameter P2 indicates or indicated that the irradiation zone IZ2 has or requires the second longest time for (complete) irradiating or the second longest time for being (completely) irradiated, respectively by the second energy beam 5b and the second irradiation unit 9 is completed, the second energy beam 5b and the second irradiation unit 9 are assigned to the irradiation zone IZ3 whose parameter P3 indicates or indicated that the irradiation zone IZ3 has or requires the third longest time for (complete) irradiating or the third longest time for being (completely) irradiated, respectively and this irradiation zone IZ3 is irradiated with the second energy beam 5b and the second irradiation unit 9. Hence, a fourth step of the method comprises assigning the second energy beam 5b and the second irradiation unit 9 to the irradiation zone IZ3 whose parameter P3 indicates that the irradiation zone IZ3 has the third longest time required for irradiating or the third longest time for being (completely) irradiated, respectively and irradiating this irradiation zone IZ3 with the second energy beam 5b and the second irradiation unit 9.

The method may be continued in analogous manner. Hence, after irradiation and consolidating of the irradiation zone IZ1 whose parameter P3 indicates or indicated that the irradiation zone IZ1 has or requires the longest time for (complete) irradiating or the longest time for being (completely) irradiated by the first energy beam 5a and the first irradiation unit 8 is completed, the first energy beam 5a and the first irradiation unit 8 are assigned to the irradiation zone IZ4 whose parameter P4 indicates or indicated that the irradiation zone IZ4 has or requires the fourth longest time for (complete) irradiating or the fourth longest time for being (completely) irradiated, respectively and this irradiation zone IZ4 is irradiated with the first energy beam 5a and the first irradiation unit 8. Hence, the method may further comprise after irradiation and consolidating the irradiation zone IZ1 whose parameter P1 indicates that the irradiation zone IZ1 has the longest time required for irradiating and irradiating with the first energy beam 5a and the first irradiation unit 8 is completed, assigning the first energy beam 5a and the first irradiation unit 8 to the irradiation zone IZ4 whose parameter P4 indicates that the irradiation zone IZ4 has the fourth longest time required for irradiating and irradiating this irradiation zone IZ4 with the first energy beam 5a and the first irradiation unit 8.

Hence, the method comprises the implementation of a specific order of irradiating respective irradiation zones IZ1-IZ4 of a respective build material layer 3 comprising a plurality of irradiation zones IZ1-IZ4 which results in a reduction of build time and/or a uniform operation of the energy beams 5a, 5b and irradiation units 8, 9, respectively.

The method is thus, particularly applicable to build material layers 3 having a plurality of different irradiation zones IZ1-IZ4, whereby the differences, which may be differences in area (size) and/or shape and/or position and/or orientation, for instance, of the irradiation zones IZ1-IZ4 result in different times for (completely) irradiating the respective irradiation zones IZ1-IZ4.

As indicated above, the parameter P1-P4 indicative of the time required for irradiating a respective irradiation zone IZ1-IZ4 may be generated on basis of a determination of diverse irradiation zone parameters of the respective irradiation zones IZ1-IZ4 within the build material layer 3, for instance.

A respective parameter P1-P4 indicative of the time required for irradiating a respective irradiation zone IZ1-IZ4 may be additionally or alternatively determined on basis of data used for irradiating the respective irradiation zone IZ1-IZ4 in the current build material layer 3 and/or on basis of data used for irradiating at least one irradiation zone IZ1-IZ4 of a previous build material layer 3 and/or on basis of data used for irradiating at least one irradiation zone IZ1-IZ4 of at least one build material layer 3 of at least one previous build job, for instance. In other words, additionally or alternatively to determining, e.g. computing, the parameter P1-P4 indicative of the time required for irradiating a respective irradiation zone IZ1-IZ4 from data used for irradiating the respective irradiation zone IZ1-IZ4, "historic data" of previously irradiated build material layers 3 in the same build job and/or of previous build jobs, i.e. previously built objects, can be used or considered for determining the parameter P1-P4 indicative of the time required for irradiating a respective irradiation zone IZ1-IZ4.

The data used for irradiating the respective irradiation zone IZ1-IZ4 and/or the data used for irradiating at least one irradiation zone IZ1-IZ4 of a previous build material layer 3 in the same build job and/or the data used for irradiating at least one irradiation zone IZ1-IZ4 of at least one build material layer 3 of at least one previous build job may be or may comprise information on the area (size) of a respective irradiation zone IZ1-IZ4 and/or information on the shape of a respective irradiation zone IZ1-IZ4 and/or information on the time (duration) required for irradiating a respective irradiation zone IZ1-IZ4 at given irradiation parameters, particularly at irradiation parameters being correlated with the speed the energy beams 5a, 5b are moved across the respective build material layer 3, such as the actual scan speed of the energy beams 5a, 5b, for instance.

Hence, the method may comprise determining the area (size) of a respective irradiation zone IZ1-IZ4 for a plurality of irradiation zones IZ1-IZ4 and/or the shape of a respective irradiation zone for each of the plurality of irradiation zones IZ1-IZ4 and/or the time required for irradiating a respective irradiation zone IZ1-IZ4 for each of the plurality of irradiation zones IZ1-IZ4. The area (size) of a respective irradiation zone IZ1-IZ4 may be determined on basis of irradiating data used for irradiating the respective irradiation zone IZ1-IZ4 and/or on basis of build data used for building the object 2, for instance. The shape of a respective irradiation zone IZ1-IZ4 may be determined on basis of irradiating data used for irradiating the respective irradiation zone IZ1-IZ4 and/or on basis of build data used for building the object 2, for instance. The time (duration) required for irradiating a respective irradiation zone IZ1-IZ4 may be determined on basis of irradiating data used for irradiating the respective irradiation zone IZ1-IZ4 and/or on basis of build data used for building the object 2, for instance. In either case, a determination unit 14 configured to determine the area (size) of a respective irradiation zone IZ1-IZ4 for each of the plurality of irradiation zones IZ1-IZ4 and/or the shape of a respective irradiation zone IZ1-IZ4 for each of the plurality of irradiation zones IZ1-IZ4 and/or the time required for irradiating a respective irradiation zone IZ1-IZ4 for each of the plurality of irradiation zones IZ1-IZ4 may be used for determining the area (size) of a respective irradiation zone IZ1-IZ4 for each of the plurality of irradiation zones IZ1-IZ4 and/or the shape of a respective irradiation zone IZ1-IZ4 for each of the plurality of irradiation zones IZ1-IZ4 and/or the time required for irradiating a respective irradiation zone IZ1-IZ4 for each of the plurality of irradiation zones IZ1-IZ4. The determination unit 14 may be implemented in the control unit 6 of the apparatus 1.

The parameter P1-P4 indicative of the time required for irradiating a respective irradiation zone IZ1-IZ4 may be determined before selective irradiation of the respective build material layer 3 is started. Hence, the order of irradiating respective irradiation zones IZ1-IZ4 of a respective build material layer 3 may be determined before selective irradiation of the respective build material layer 3 is started which results in that no further (computing) resources for determining the order of irradiating respective irradiation zones IZ1-IZ4 of a respective build material layer 3 are required during the actual selective irradiation of the respective build material layer 3.

As will be explained in context with FIG. 3, 4, the method may further comprise considering at least one boundary condition for assigning the first energy beam 5a and the first irradiation unit 8 to the irradiation zone IZ1 whose parameter P1 indicates that the irradiation zone IZ1 has the longest time required for irradiating and/or considering at least one boundary condition for assigning the second energy beam 5b and the second irradiation unit 9 to the irradiation zone IZ2 whose parameter P2 indicates that the irradiation zone IZ2 has the second longest time required for irradiating. This applies to all other irradiation order steps in analogous manner. As such, the order of irradiation may be individually adapted if required, i.e. in cases in which at least one respective boundary condition is met or not met, respectively.

According to the exemplary embodiment of FIG. 3, the area (size) and/or shape and/or orientation and/or position of a first irradiation zone IZ1 which is irradiatable by the first irradiation unit 8 and/or the area (size) and/or shape and/or orientation and/or position of a second irradiation zone IZ2 which is irradiatable by a second irradiation unit 9 may be considered as a boundary condition. As such, the position and/or orientation of irradiation zones within sub-zones 15, 16 of the build plane BP which sub-zones 15, 16 are assigned to a specific irradiation unit 8, 9 may be considered as a boundary condition. Thus, situations in which an irradiation zone IZ1-IZ4 is to be irradiated with an energy beam 5a, 5b and an irradiation unit 8, 9 which cannot (completely) cover or reach the respective irradiation zone IZ1-IZ4 can be avoided. In the exemplary embodiment of FIG. 3, the (first) sub-zone 15 of the build plane BP indicates the region of the build plane BP which can be irradiated with the first irradiation unit 8 and the (second) sub-zone 16 of the build plane BP indicates the region of the build plane BP which can be irradiated with the first irradiation unit 9.

As a further example depicted in FIG. 4, the orientation and/or position of a respective irradiation zone IZ1-IZ4 relative to a gas stream (indicated by arrow 17), e.g. an inert gas stream, capable of being charged with non-consolidated particulate impurities and/or residues generated during selective irradiation of a build material layer 3 may be considered as a boundary condition. As such, the position and/or orientation of irradiation zones IZ1-IZ4 relative to the streaming direction of a respective gas stream may be considered as a boundary condition. Thus, situations in which irradiating an irradiation zone IZ1-IZ4 could or would result in negative interaction of the energy beam 5a, 5b which was initially supposed to be used for irradiating the respective irradiation zone IZ1-IZ4 with the gas stream can be avoided.

In either case, irradiating the irradiation zone IZ1-IZ4 whose assigned parameter P1-P4 indicates that the irradiation zone IZ1-IZ4 has the longest time required for irradiating and the irradiation zone IZ1-IZ4 whose assigned parameter P1-P4 indicates that the irradiation zone IZ1-IZ4 has the second longest time required for irradiating may be started at the same time. This allows for a best possible reduction of the build time.

Irradiating the irradiation zone IZ1-IZ4 whose assigned parameter P1-P4 indicates that the irradiation zone IZ1-IZ4 has the longest time required for irradiating and the irradiation zone IZ1-IZ4 whose assigned parameter P1-P4 indicates that the irradiation zone IZ1-1Z4 has the second longest time required for irradiating are irradiated with the same irradiation parameters. This allows for uniform structural properties of the object 2 which is/was additively manufactured with the method in all cross-sectional areas. Yet, it is also conceivable that the irradiation zone IZ1-IZ4 whose assigned parameter P1-P4 indicates that the irradiation zone IZ1-IZ4 has the longest time required for irradiating and the irradiation zone whose assigned parameter P1-P4 indicates that the irradiation zone IZ1-1Z4 has the second longest time required for irradiating are irradiated with different irradiation parameters. This allows for providing different cross-sectional areas of the object 2 which is/was additively manufactured with the method with different structural properties which can be useful e.g. for realizing objects 2 having customized structural properties.

In the possible case that the parameters P of two or more irradiation zones IZ of a specific build material layer 3 indicate that these two or more irradiation zones IZ each (absolutely or relatively) have the longest time for (complete) irradiating or the longest time for being (completely) irradiated, respectively, a decision can be made to which of these irradiation zones IZ the first energy beam 5a and the first irradiation unit 8 is assigned and to which of these irradiation zones IZ the second energy beam 5b and the second irradiation unit 9 is assigned. In other words, if two or more irradiation zones IZ of a specific build material layer 3 require the same time for (complete) irradiating or the same time for being (completely) irradiated, respectively and this time (absolutely or relatively) exceeds the time for (complete) irradiating or the time for being (completely) irradiated, respectively of other irradiation zones IZ in the respective build material layer 3, then a decision is made to which of these irradiation zones IZ the first energy beam 5a and the first irradiation unit 8 is assigned and to which of these irradiation zones IZ the second energy beam 5b and the second irradiation unit 9 is assigned. The decision can be a random or a non-random decision. The decision can be made by a hardware- and/or software implemented decision unit 18. The decision unit 18 can be implemented in the control unit 6 of the apparatus 1.

Single, a plurality, or all features mentioned in context with a specific embodiment may also apply to other embodiments. Hence, a single, a plurality, or all features mentioned in context with a specific embodiment may be combined with at least one feature of another specific embodiment.

The invention claimed is:

1. A method for additively manufacturing at least one three-dimensional object by successive layerwise selective irradiation and consolidation of build material layers, whereby at least one build material layer which is to be selectively irradiated and consolidated comprises a plurality of irradiation zones being separately irradiatable and consolidatable with at least one energy beam, comprising
    assigning, by a control unit, a parameter indicative of a time required for irradiating a respective irradiation zone to a plurality of irradiation zones of the respective build material layer,
    assigning, by the control unit, at least one first energy beam to a first irradiation zone whose parameter indicates that the first irradiation zone has the longest time required for irradiating and irradiating the first irradiation zone with the at least one first energy beam,
    assigning, by the control unit, at least one second energy beam to the irradiation zone whose parameter indicates that the irradiation zone has the second longest time required for irradiating and irradiating this irradiation zone with the at least one second energy beam, wherein after irradiation and consolidating the irradiation zone whose parameter indicates that the irradiation zone has the second longest time required for irradiating and irradiating with the at least one second energy beam is completed,
    assigning, by the control unit, the at least one second energy beam to the irradiation zone whose parameter indicates that the irradiation zone has the third longest time required for irradiating and irradiating this irradiation zone with the at least one second energy beam.

2. The method according to claim 1, comprising after irradiation and consolidating the irradiation zone whose parameter indicates that the irradiation zone has the longest time required for irradiating and irradiating with the at least one first energy beam is completed,
    assigning, by the control unit, the at least one first energy beam to the irradiation zone whose parameter indicates that the irradiation zone has the fourth longest time required for irradiating and irradiating this irradiation zone with the at least one first energy beam.

3. The method according to claim 1, wherein the parameter indicative of the time required for irradiating a respective irradiation zone is determined on basis of data used for irradiating a current irradiation zone and/or on basis of data used for irradiating at least one irradiation zone of a previous build material layer and/or on basis of data used for irradiating at least one irradiation zone of at least one build material layer of at least one previous build job.

4. The method according to claim 3, wherein the data used for irradiating the respective irradiation zone and/or the data used for irradiating at least one irradiation zone of a previous build material layer and/or the data used for irradiating at least one irradiation zone of at least one build material layer of at least one previous build job is or comprises information on the area of a respective irradiation zone and/or information on the shape of a respective irradiation zone and/or information on the time required for irradiating a respective irradiation zone at given irradiation parameters.

5. The method according to claim 1, wherein the parameter indicative of the time required for irradiating a respective irradiation zone is determined before selective irradiation of the respective build material layer is started.

6. The method according to claim 1, comprising considering at least one boundary condition for assigning the at least one first energy beam to the irradiation zone whose parameter indicates that the irradiation zone has the longest time required for irradiating and/or considering at least one boundary condition for assigning the at least one second energy beam to the irradiation zone whose parameter indicates that the irradiation zone has the second longest time required for irradiating.

7. The method according to claim 6, wherein the size and/or shape and/or orientation and/or position of a first irradiation zone which is irradiatable by a first irradiation unit and/or the size and/or shape and/or orientation and/or position of a second irradiation zone which is irradiatable by a second irradiation unit is considered as a boundary condition.

8. The method according to claim 6, wherein the orientation and/or position of a respective irradiation zone relative to a gas stream capable of being charged with non-consolidated particulate impurities and/or residues generated during selective irradiation of a build material layer is considered as a boundary condition.

9. The method according to claim 1, wherein irradiating the irradiation zone whose assigned parameter indicates that the irradiation zone has the longest time required for irradiating and the irradiation zone whose assigned parameter indicates that the irradiation zone has the second longest time required for irradiating is started at the same time.

10. The method according to claim 1, wherein irradiating the irradiation zone whose assigned parameter indicates that the irradiation zone has the longest time required for irradiating and the irradiation zone whose assigned parameter indicates that the irradiation zone has the second longest time required for irradiating are irradiated with the same irradiation parameters.

11. A control unit for an apparatus for additively manufacturing at least one three-dimensional object by means of successive layerwise selective irradiation and consolidation of build material layers, whereby at least one build material layer which is to be selectively irradiated and consolidated comprises a plurality of irradiation zones being separately irradiatable and consolidatable with at least one energy beam, wherein
the control unit is configured to control the successive layerwise selective irradiation and consolidation of respective irradiation zones in accordance with the method according to claim 1.

12. The method according to claim 1, further comprising:
assigning, by the control unit, a parameter indicative of the time required for irradiating the respective irradiation zone to each irradiation zone of the respective build material layer.

* * * * *